United States Patent
Speranza

(10) Patent No.: US 6,382,091 B1
(45) Date of Patent: May 7, 2002

(54) METHOD OF CODING A HIGH-SPEED OBJECT

(76) Inventor: Bernard E. Speranza, 9216 White Oak Ave., Munster, IN (US) 46321

( * ) Notice: Subject to any disclaimer, the term of this patent is extended or adjusted under 35 U.S.C. 154(b) by 0 days.

(21) Appl. No.: 09/727,564

(22) Filed: Dec. 1, 2000

(51) Int. Cl.[7] .......................... B41F 17/14; B41F 17/20
(52) U.S. Cl. ........................... 101/35; 101/42; 101/41; 101/483; 101/485
(58) Field of Search ........................... 101/18, 21, 42, 101/43, 35, 36, 37, 483, 485

(56) References Cited

U.S. PATENT DOCUMENTS

| | | | |
|---|---|---|---|
| 3,864,691 A | * 2/1975 | Schroeder | 346/74.2 |
| 4,506,999 A | 3/1985 | Robertson | 400/121 |
| 4,808,018 A | 2/1989 | Roberston et al. | 400/121 |
| 4,883,291 A | 11/1989 | Robertson | 283/117 |
| 4,985,715 A | 1/1991 | Cyphert et al. | 346/140 R |
| 5,015,106 A | 5/1991 | Robertson et al. | 400/121 |
| 5,074,244 A | * 12/1991 | Byers | 118/669 |
| 5,144,330 A | * 9/1992 | Bennet | 347/2 |
| 5,199,109 A | 3/1993 | Baker | 346/1.1 |

* cited by examiner

*Primary Examiner*—Daniel J. Colilla
(74) *Attorney, Agent, or Firm*—Wallenstein & Wagner, Ltd.

(57) ABSTRACT

A method of coding a high-speed object having a lateral travel path with a multi-digit production series number is disclosed. A first marking member and a second marking member are provided, with the second marking member positioned vertically adjacent the first marking member. A plurality of marking locations are defined and a group of marks are applied along each of the plurality of marking locations. The quantity of marks in each group represents a respective digit of the multi-digit series number.

10 Claims, 2 Drawing Sheets

METHOD OF CODING A HIGH-SPEED OBJECT

TECHNICAL FIELD

The invention relates to a method of coding high-speed objects and, more particularly, to a method for coding a high-speed object, such as a pipe, having a lateral travel path with a multi-digit production series number.

BACKGROUND OF THE INVENTION

Requirements have developed in many industries to devise techniques for tracing the history of a product through the course of a multi-stage production process. Specifically, manufacturers desire to track the location of an object within a production series. This is sometimes referred to as the "in process number." Pipes, or other products such as structural shapes, in a production series can easily be separated and identified for applying a complete identification number. However, the chronological order of each pipe within the series may be disturbed as the pipes get mixed on the cooling conveyors.

Prior art marking technology involves the formation of characters or symbols in dot matrix fashion using discrete jets of marker fluid or ink. This marker ink is expressed from select ones of a linear array of nozzles in conjunction with atomizing air to form dots at the workpiece to be marked. However, marking of fast-moving pipes in a production line with spray paint dots may be difficult. Oftentimes, the pipe moves so quickly that the paint spray dots are distorted which, in turn, distorts the alpha numeric symbols they are attempting to represent. For example, at speeds above 600 feet per minute, the shape of the ink jet spray becomes a rectangle with rounded short ends oval. Accordingly, marking pipe in a production line utilizing prior art ink or paint jet spray is unsuccessful since the marks are not readable.

Various systems have been proposed for marking multi-character messages on the surface of solid materials, such as disclosed in U.S. Pat. Nos. 4,506,999; 4,808,018; 4,883,291; 4,985,715; 5,015,106; and 5,119,109. However, these systems are relatively complex.

The present invention is provided to solve these and other problems.

SUMMARY OF THE INVENTION

It is an object of the present invention to provide a method of coding a high-speed object, such as a pipe, having a lateral travel path with a multi-digit production series number. Preferably, the pipe is moving at a speed of at least 600 feet per minute.

In accordance with the invention, a first marking member and a second marking member are provided. The second marking member is positioned vertically adjacent the first marking member. In one aspect of the invention, a third marking is provided vertically adjacent the second marking member. The second marking member is positioned between the first marking member and the third marking member. Preferably, the marking members are nozzles.

A plurality of peripherally-spaced, axially-directed marking locations are defined and a group of generally elongated marks are applied along each of the plurality of marking locations. The quantity of marks in each group represents a respective digit of the multi-digit production series number. The marks are read and assigned the respective digit of the multi-digit series number.

It is contemplated that a plurality of test marking locations are defined prior to defining the plurality of marking locations. A generally elongated mark is applied along each of the plurality of test marking locations before applying a group of marks along each of the plurality of marking locations.

It is also contemplated that a plurality of test marking locations are defined after defining the plurality of marking locations. A generally elongated mark is applied along each of the plurality of test marking locations after applying a group of marks along each of the plurality of marking locations.

It is further contemplated that the group of marks is visually-readable by a human observer.

It is still further contemplated that the group of marks is machine-readable.

Other features and advantages of the invention will be apparent from the following specification taken in conjunction with the following drawings.

DETAILED DESCRIPTION OF THE PREFERRED EMBODIMENT

Figure 1:
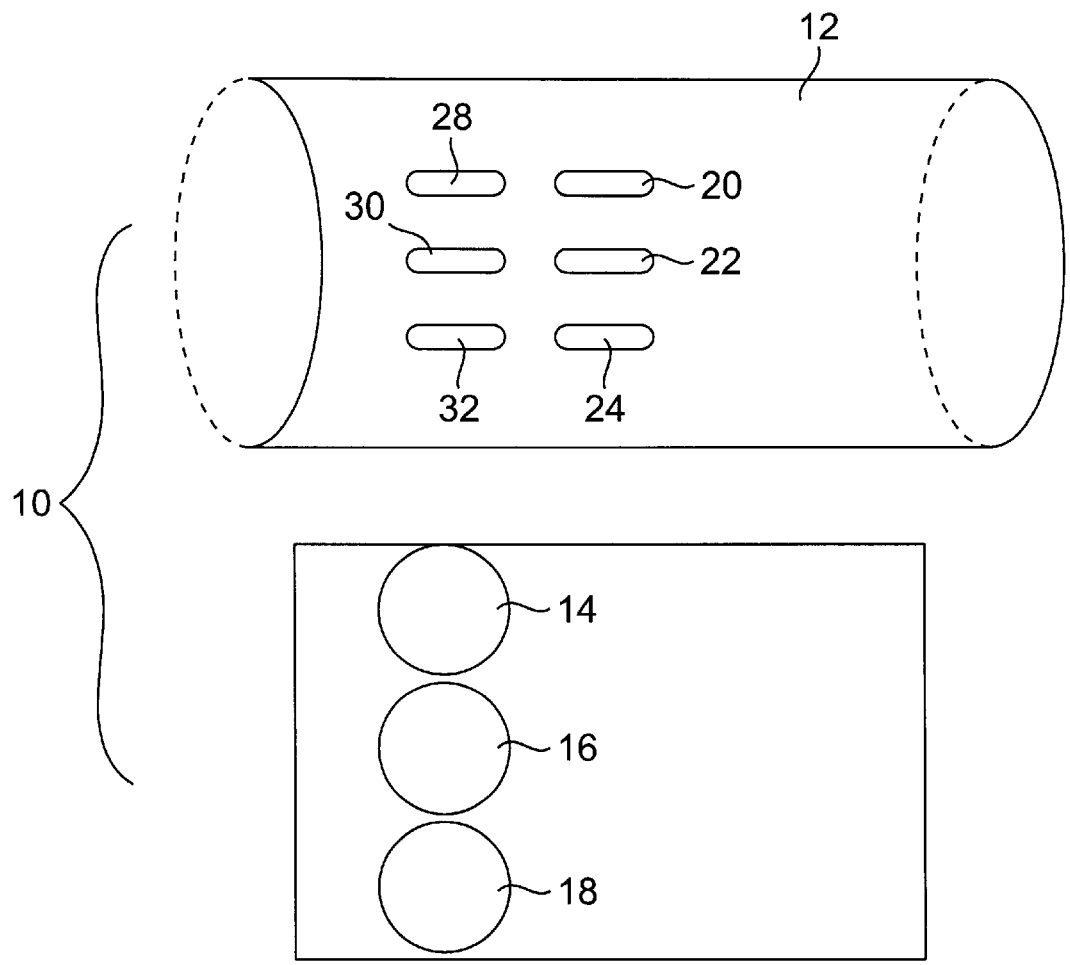
FIG. 1 is an exploded front view of the components of a system for coding a high-speed object according to a preferred aspect of the invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

A system, generally designated 10, for coding a high-speed object, such as pipe 12, having a lateral travel path with a multi-digit production series number is illustrated in FIG. 1.

System 10 has a first marking member 14 and a second marking member 16. Preferably, first marking member 14 and second marking member 16 are paint nozzles or jets. Second marking member 16 is positioned vertically adjacent first marking member 14. Preferably, system 10 has a third marking member 18 positioned vertically adjacent second marking member 16. The second marking member 16 is positioned between first marking member 14 and third marking member 18 (see FIG. 1). The marking members may be paint nozzles used for coding high-speed objects, such as the nozzle distributed by Magnemag Corporation of Copenhagen, Denmark.

In one aspect of the invention, pipe 12 travels at a speed in excess of 600 feet per minute. Moreover, the surface temperature of pipe 12 may exceed 1500 degrees Fahrenheit. The marking members project fluid, such as ink or paint, capable of adhering to pipes traveling in excess of 600 feet per minute and having a surface temperature in excess of 1500 degrees Fahrenheit. Inks, such as high alkaline inks formed with ceramic particle suspensions, are utilized for high temperature environments.

A plurality of peripherally-spaced, axially-directed marking locations are shown in FIG. 1. First marking location 20, second marking location 22 and third marking location 24 are utilized to code pipe 12 with a multi-digit production series number, ranging from 0 to 999. It is contemplated that only one marking location is utilized for coding pipe 12 with a single digit production series number, ranging from 0 to 9. It is likewise contemplated that only two marking locations are utilized for coding pipe 12 with a multi-digit production series number, ranging from 0 to 99. If the production series desired to identify 10,000 units, four marking locations are required, 100,000 units, five marking locations, etc.

Figure 4:
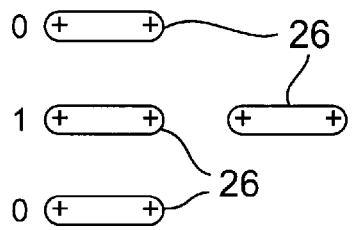
FIG. 4 is a front view of the pipe of FIG. 1 after coding, showing the number 010.
Figure 2:
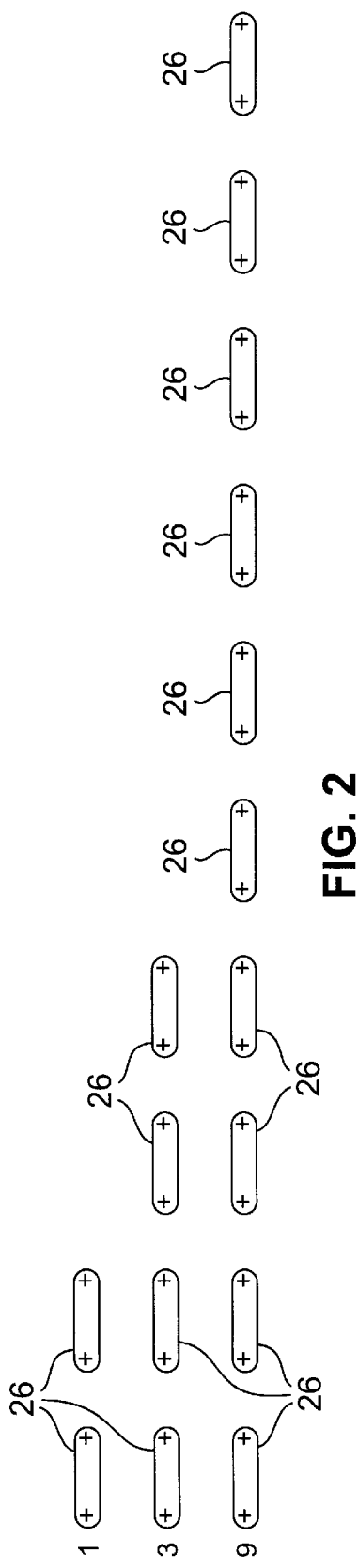
FIG. 2 is a front view of the pipe of FIG. 1 after coding, showing the number 139.
Figure 3:
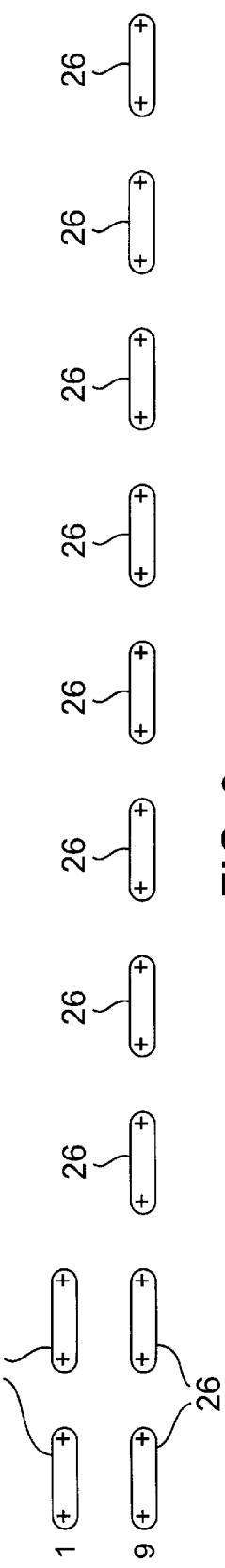
FIG. 3 is a front view of the pipe of FIG. 1 after coding, showing the number 019.

As shown in FIGS. 2–4, marking members 14, 16 and 18 apply a group of generally elongated marks 26 along each of marking locations 20, 22 and 24. The quantity of marks in each group represents a respective digit of the multi-digit production series number. For example, the number 139 is shown in FIG. 2. First marking member 14 fires one burst of ink at first marking location 20 resulting in one mark 26 along first marking location 20. This one mark indicates the number 100. Second marking member 16 fires three bursts of ink at second marking location 22 resulting in three marks 26 along second marking location 22. These three marks indicate the number 30. Third marking member 18 fires nine bursts of ink at third marking location 24 resulting in nine marks 26 along third marking location 24. These nine marks indicate the number 9. The code is then read from top to bottom as 139. Similar to FIG. 2, FIG. 3 illustrates the number 019 and FIG. 4 illustrates the number 010.

In another aspect of the invention, and as shown in FIG. 1, system 10 further has a plurality of test marking locations. First test marking location 28, second test marking location 30 and third test marking location 32 are provided before marking locations 20, 22 and 24, respectively. Marking members 14, 16 and 18 apply a test mark one unit before the beginning of the code to illustrate that the marking members are operating properly. This is especially important when one of the three numbers in the multi-digit production series number is a zero (0). To eliminate any uncertainty whether there are intentionally no marks at a specific marking location, one mark 26 is applied at each of test marking locations 28, 30 and 32. Likewise, three additional test marking locations may be provided after marking locations 20, 22 and 24, respectively, to indicate the end of the code.

In a further aspect of the invention, the group of marks 26 is visually-readable by a human observer. Moreover, the group of marks 26 is machine-readable.

While the specific embodiment has been illustrated and described, numerous modifications come to mind without significantly departing from the spirit of the invention, and the scope of protection is only limited by the scope of the accompanying Claims.

What is claimed is:

1. A method of coding a high-speed object having a lateral travel path with a multi-digit production series number comprising the steps of:

providing a first marking member and a second making member;

positioning the first marking member;

positioning the second marking member proximate the first marking member;

defining a plurality of marking locations;

applying a group of generally elongated marks along each of the plurality of marking locations, a quantity of marks in each group representing a respective digit of the multi-digit series number;

reading the quantity of marks in the group of marks; and, assigning the respective digit of the multi-digit series number to the quantity of marks in the group of marks.

2. The method of claim 1 further comprising the steps of:

providing a third marking member; and, positioning the third marking member proximate the second marking member, with the second marking member positioned between the first marking member and the third marking member.

3. The method of claim 1 further comprising the steps of:

defining a plurality of first test marking locations before the step of defining the plurality of marking locations; and, applying a generally elongated mark along each of the plurality of first test marking locations before applying the group of generally elongated marks along each of the plurality of marking locations.

4. The method of claim 3 further comprising the steps of:

defining a plurality of second test marking locations after the step of defining the plurality of peripherally-spaced, axially-directed marking locations; and, applying a generally elongated mark along each of the plurality of second test marking locations after applying the group of generally elongated marks along each of the plurality of marking locations.

5. The method of claim 1 wherein the group of marks is visually-readable by a human observer.

6. The method of claim 1 wherein the group of marks is machine-readable.

7. The method of claim 1 wherein the high-speed object is a pipe.

8. The method of claim 7 wherein the pipe is moving at a speed of at least 600 feet per minute.

9. The method of claim 1 wherein the first and second marking members are nozzles.

10. The method of claim 2 wherein the third marking member is a nozzle.

* * * * *